United States Patent
Guday et al.

(10) Patent No.: US 10,863,355 B2
(45) Date of Patent: Dec. 8, 2020

(54) SHARED WI-FI USAGE

(71) Applicant: Microsoft Technology Licensing, LLC, Redmond, WA (US)

(72) Inventors: Shai Guday, Redmond, WA (US); David Neil MacDonald, Seattle, WA (US); Tyler Edward Hennessy, Woodinville, WA (US); Sidharth Nabar, Seattle, WA (US); Brent Edward Ford, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/028,571

(22) Filed: Jul. 6, 2018

(65) Prior Publication Data
US 2018/0324591 A1 Nov. 8, 2018

Related U.S. Application Data

(63) Continuation of application No. 14/071,588, filed on Nov. 4, 2013, now Pat. No. 10,039,002.

(51) Int. Cl.
*G06F 7/04* (2006.01)
*G06F 15/16* (2006.01)
(Continued)

(52) U.S. Cl.
CPC ............ *H04W 12/08* (2013.01); *H04L 63/08* (2013.01); *H04W 12/003* (2019.01);
(Continued)

(58) Field of Classification Search
CPC ..... H04W 84/12; H04W 48/16; H04W 12/04; H04W 12/08; H04W 12/06; H04W 76/02;
(Continued)

(56) References Cited

U.S. PATENT DOCUMENTS 7,266,089 B2  9/2007 Cook
8,289,997 B2  10/2012 Evans et al.
(Continued)

FOREIGN PATENT DOCUMENTS

CN         1885297 A    12/2006
CN       102724668 A    10/2012
(Continued)

OTHER PUBLICATIONS

"Product Description", Retrieved From http://www.juniper.net/us/en/local/pdf/datasheets/1000366-en.pdf, Sep. 30, 2013, Sep. 30, 2013, 8 Pages.
(Continued)

*Primary Examiner* — Trong H Nguyen
(74) *Attorney, Agent, or Firm* — Ray Quinney & Nebeker P.C; James Bullough

(57) ABSTRACT

Various technologies described herein pertain to utilization of shared Wi-Fi. For instance, network access rights of a Wi-Fi network can be controlled by a mobile device of a point of contact for the Wi-Fi network. Moreover, utilization of a Wi-Fi network can be tracked and usage data indicative of historic utilization of the Wi-Fi network can be retained. Further, groups of users between whom Wi-Fi credentials are shared can be created.

20 Claims, 12 Drawing Sheets

(51) Int. Cl.
*H04L 29/06* (2006.01)
*H04W 12/08* (2009.01)
*H04W 12/00* (2009.01)
*H04W 12/06* (2009.01)
*H04W 12/04* (2009.01)
*H04W 84/12* (2009.01)

(52) U.S. Cl.
CPC ........... *H04W 12/04* (2013.01); *H04W 12/06* (2013.01); *H04L 63/1425* (2013.01); *H04L 63/308* (2013.01); *H04W 84/12* (2013.01)

(58) Field of Classification Search
CPC ...... H04W 48/00; H04L 51/32; H04L 12/588; H04L 63/083; H04L 63/102; H04L 67/30; H04L 67/303; H04L 67/306; H04L 63/062; H04L 9/32; H04L 63/107; H04L 63/08; H04L 63/105
See application file for complete search history.

(56) References Cited

U.S. PATENT DOCUMENTS

| | | | |
|---|---|---|---|
| 8,306,502 | B2 | 11/2012 | Varsavsky Waisman-Diamond |
| 10,039,002 | B2 | 7/2018 | Guday et al. |
| 2005/0080859 | A1* | 4/2005 | Lake .................. H04L 51/04 709/206 |
| 2007/0255837 | A1 | 11/2007 | Hassan et al. |
| 2008/0100274 | A1 | 5/2008 | Hayakawa |
| 2008/0195741 | A1 | 8/2008 | Wynn et al. |
| 2008/0250478 | A1 | 10/2008 | Miller et al. |
| 2009/0054058 | A1 | 2/2009 | Andreasson et al. |
| 2012/0051344 | A1 | 3/2012 | Taylor et al. |
| 2012/0110643 | A1 | 5/2012 | Schmidt et al. |
| 2012/0284638 | A1* | 11/2012 | Cutler .................. G06Q 10/00 715/751 |
| 2013/0143529 | A1 | 6/2013 | Leppanen et al. |
| 2013/0309971 | A1* | 11/2013 | Kiukkonen ........... H04L 63/107 455/41.2 |
| 2014/0066013 | A1 | 3/2014 | Mascarenhas et al. |
| 2014/0071967 | A1 | 3/2014 | Velasco |
| 2014/0092813 | A1* | 4/2014 | Jaakkola ............... H04W 48/16 370/328 |
| 2015/0172925 | A1* | 6/2015 | Leppanen ............. H04W 12/04 726/7 |

FOREIGN PATENT DOCUMENTS

| | | | |
|---|---|---|---|
| CN | 102833877 | A | 12/2012 |
| EP | 2608447 | A3 | 6/2013 |
| WO | 2012164328 | A1 | 12/2012 |
| WO | 2013154493 | A1 | 10/2013 |
| WO | 2013160526 | A1 | 10/2013 |
| WO | WO-2013154493 | A1 * | 10/2013 |

OTHER PUBLICATIONS

"WiFi", Retrieved From: https://en.wikipedia.org/wiki/Wi-Fi, Mar. 15, 2013, 9 Pages.
"Office Action Issued in European Patent Application No. 14802284.1", dated Sep. 6, 2018, 7 Pages.
"Office Action Issued in Chinese Patent Application No. 201480060508.9", dated Jul. 27, 2018, 14 Pages.
"Final Office Action Issued in Chinese Patent Application No. 201480060508.9", dated May 22, 2019, 8 Pages.
"Second Office Action Issued in Chinese Patent Application No. 201480060508.9", dated Feb. 22, 2019, 11 Pages.
"Office Action Issued in European Patent Application No. 14802284.1", dated Mar. 27, 2019, 5 Pages.
"User Manual: 350 East Plumeria Drive Genie App and Genie Mobile App", Retrieved from http://www.downloads.netgear.com/files/GDC/WNR1000V2/genie_UM_15Jun12.pdf, Jun. 30, 2012, 36 Pages.
Mamatas, et al., "Incentives and Algorithms for Broadband Access Sharing," Retrieved at <<http://utopia.duth.gr/~emamatas/homenets2010.pdf>>, in Proceedings of the 2010 ACM Sigcomm Workshop on Home Networks, Sep. 3, 2010, pp. 19-24.
Ai, et al., "Wi-Sh: A Simple, Robust Credit Based Wi-Fi Community Network," Retrieved at <<http://ieeexplore.ieee.org/stamp/stamp.jsp?tp=&arnumber=5062082>>, in Proceedings of Infocom 2009, Apr. 19, 2009, pp. 1-9.
"International Search Report & Written Opinion Received for PCT Application No. PCT/US2014/063868", dated Apr. 29, 2015, 20 Pages.
"Netgear: Genie App and Genie Mobile App", Available at: <<http://www.downloads.netgear.com/files/GDC/WNR1000V2/genie_UM_15Jun12.pdf>>, Jun. 2012, 36 Pages.
"Juniper Networks: Ringmaster", Available at: <<http://www.juniper.net/us/en/local/pdf/datasheets/1000366-en.pdf>>, Sep. 2013, 8 Pages.
"Juniper Networks: SmartPass 7.6 User's Guide", Available at: <<http://web.archive.org/web/20140612013933/http://www.juniper.net/techpubs/en_US/release-independent/wireless/information-products/topic-collections/wireless-lan/software/7.6/sp-76-user.pdf>>, Jan. 2011, 70 Pages.
"Response to the International Search Report (ISR) and Written Opinion for PCT Patent Application No. PCT/US2014/063868", Filed Date: Aug. 11, 2015, 11 pages.
"Second Written Opinion Issued in PCT Application No. PCT/US2014/063868", dated Aug. 28, 2015, 14 Pages.
"International Preliminary Report on Patentability for PCT Application No. PCT/US2014/063868", dated Feb. 9, 2016, 27 Pages.
"Response to the Communication Pursuant to Rules 161(1) and 162 EPC for European Patent Application No. 14802284.1", Filed Date: Jul. 15, 2016, 18 Pages.
"Voluntary Claim Amendments for Chinese Patent Application No. 201480060508.9", Filed Date: Oct. 12, 2016, 19 Pages.
"Office Action for U.S. Appl. No. 14/071,588", dated Nov. 5, 2015, 58 Pages.
"Response to the Office Action for U.S. Appl. No. 14/071,588", filed Jan. 31, 2016, 21 pages.
"Final Office Action for U.S. Appl. No. 14/071,588", dated May 19, 2016, 49 pages.
"Response to the Final Office Action for U.S. Appl. No. 14/071,588", filed Nov. 18, 2016, 21 pages.
"Office Action for U.S. Appl. No. 14/071,588", dated Jun. 20, 2017, 73 pages.
"Response to the Office Action for U.S. Appl. No. 14/071,588", filed Nov. 24, 2017, 17 pages.
"Notice of Allowance and Fees Due for U.S. Appl. No. 14/071,588", dated Mar. 28, 2018, 101 pages.
"Office Action Issued in European Patent Application No. 14802284.1", dated Oct. 25, 2019, 4 Pages.
"Third Office Action Issued in Chinese Patent Application No. 201480060508.9", dated Nov. 27, 2019, 6 Pages.
"Office Action Issued in European Patent Application No. 14802284.1", dated Oct. 27, 2020, 04 Pages.

* cited by examiner

SHARED WI-FI USAGE

RELATED APPLICATIONS

This application is a continuation of U.S. patent application Ser. No. 14/071,588, filed on Nov. 4, 2013, and entitled "SHARED WI-FI USAGE". The entirety of this application is incorporated herein by reference.

BACKGROUND

Wireless fidelity (Wi-Fi) networks have generally increased in popularity. By way of example, Wi-Fi networks have become more prevalent in homes, businesses, public areas, and so forth. A computing device, for instance, can connect to and exchange data via a Wi-Fi network. When connected to the Wi-Fi network, the computing device may use and/or access various network resources made available on the Wi-Fi network, such as the Internet, network attached storage, printers, other computing devices on the Wi-Fi network, and so forth.

Traditional approaches for sharing access to a Wi-Fi network oftentimes involve an owner of a Wi-Fi network (or someone else who has knowledge of credentials) providing credentials for the Wi-Fi network to a disparate user to enable the disparate user to access the Wi-Fi network. By way of illustration, an owner of a Wi-Fi network can provide a disparate user with the credentials for the Wi-Fi network at his house when the disparate user comes to visit. Yet, it may be difficult for the owner to remember the credentials, distracting to the owner to be interrupted by the disparate user who desires to access the Wi-Fi network, and time-consuming for both the owner and the disparate user.

Upon connecting to the Wi-Fi network with the credentials, the disparate user may have access to the network resources that are available to the owner of the Wi-Fi network. With conventional techniques, restricting access of the disparate user to one or more of the network resources oftentimes is complex and time-consuming.

SUMMARY

Described herein are various technologies that pertain to utilization of shared Wi-Fi. According to various embodiments, network access rights of a Wi-Fi network can be controlled by a mobile device of a point of contact for the Wi-Fi network (e.g., owner of the Wi-Fi network, user appointed to control access to Wi-Fi network, etc.). The mobile device can authorize providing shared credentials for the Wi-Fi network to a receiver mobile device, where the shared credentials can be usable by the receiver mobile device to connect to the Wi-Fi network. The mobile device can further provide access rights data to a network computing device in the Wi-Fi network. For instance, the mobile device can transmit the access rights data to the network computing device in the Wi-Fi network. By way of another illustration, the mobile device can transmit the access rights data to a server computing device, where the server computing device can further provide the access rights data to the network computing device in the Wi-Fi network. Moreover, the access rights data can specify a first subset of network resources of the Wi-Fi network permitted for utilization by the receiver mobile device when the receiver mobile device connects to the Wi-Fi network using the shared credentials. The access rights data can further specify a second subset of the network resources of the Wi-Fi network inhibited from being utilized by the receiver mobile device when the receiver mobile device connects to the Wi-Fi network using the shared credentials. Thus, the network computing device can employ the access rights data to control the network resources permitted for utilization by the receiver mobile device when the receiver mobile device connects to the Wi-Fi network using the shared credentials.

In accordance with various embodiments, utilization of a Wi-Fi network can be tracked and usage data indicative of historic utilization can be retained (e.g., by server computing device(s), network computing device(s), mobile device(s), etc.). For instance, at least one server computing device can receive, from a network computing device in the Wi-Fi network, data indicative of historic utilization of the Wi-Fi network by a receiver mobile device tracked by the network computing device. The receiver mobile device can use shared credentials for the Wi-Fi network to access the Wi-Fi network, and the shared credentials can be shared with the receiver mobile device by a provider mobile device. The data indicative of the historic utilization of the Wi-Fi network by the receiver mobile device tracked by the network computing device can be retained as part of usage data in a data repository by the server computing device. The usage data can be indicative of historic utilization of Wi-Fi networks by receiver mobile devices. Further, a request to retrieve at least a portion of the usage data retained in the data repository can be received, a search based upon the request to retrieve the portion of the usage from the data repository can be executed, and the portion of the usage data can be returned in response to the request.

Pursuant to various embodiments, a group of users between whom Wi-Fi credentials are shared can be created. The group of users can be created by a mobile device, a server computing device, a combination thereof, and so forth. Moreover, a set of mobile devices employed by the users included in the group can be identified. Further, shared credentials for the Wi-Fi network can be provided to the mobile devices in the set.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
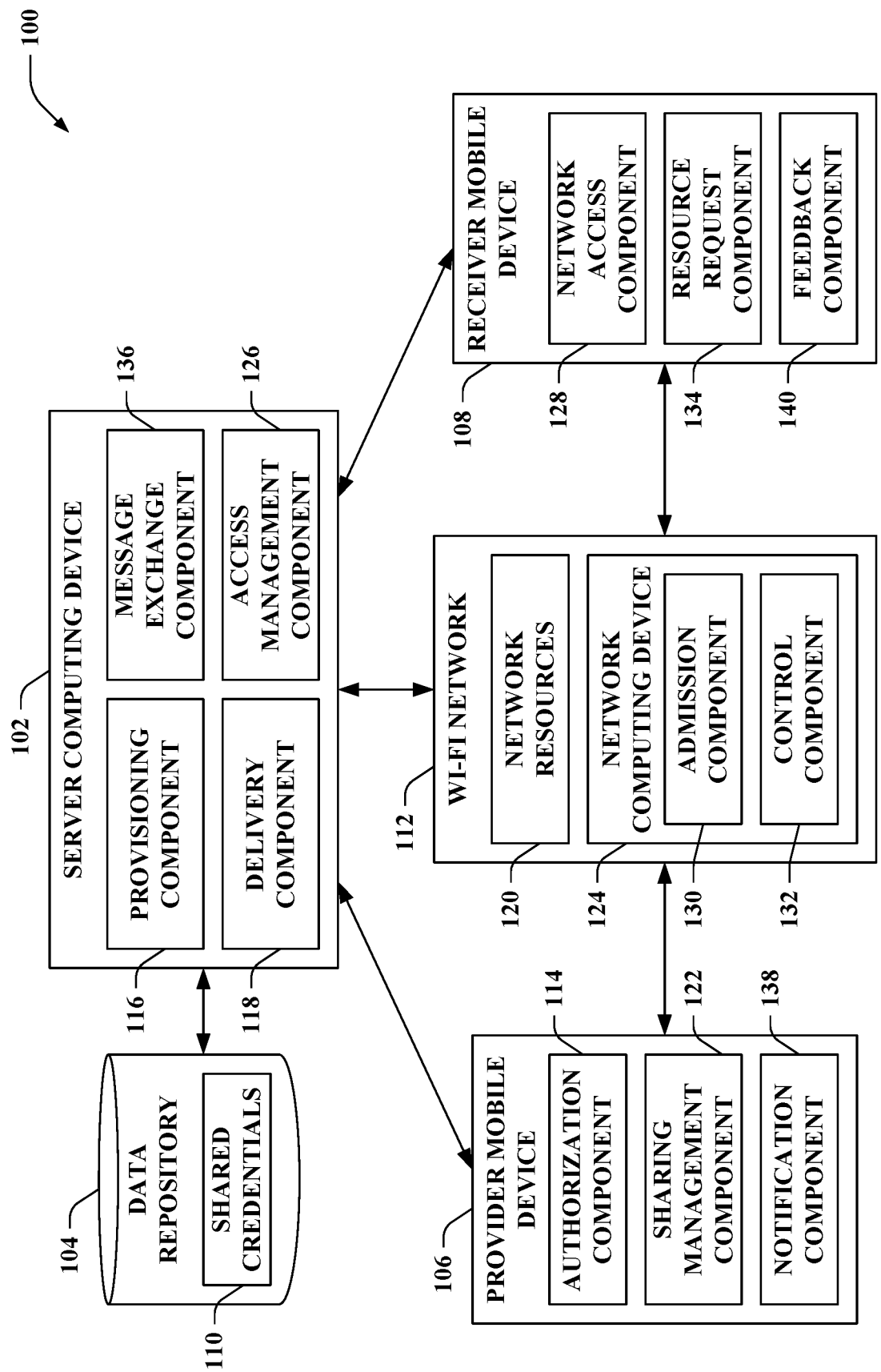
FIG. 1 illustrates a functional block diagram of an exemplary system that supports utilizing shared credentials for Wi-Fi networks.

Various technologies pertaining to utilizing shared Wi-Fi are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that supports utilizing shared credentials for Wi-Fi networks. The system 100 includes at least one server computing device 102 and a data repository 104. While many of the examples set forth below describe embodiments that include one server computing device and one data repository, it is to be appreciated that such examples can be extended to embodiments that include a plurality of server computing devices and/or a plurality of data repositories.

The system 100 further includes a plurality of mobile devices. A mobile device, for example, can be a mobile phone (e.g., smartphone), a tablet computer, a handheld computer, a laptop computer, a wearable computer, a personal digital assistant (PDA), a portable gaming device, an in-vehicle communications and infotainment system, or the like. As shown in the depicted example of FIG. 1, the system 100 includes a provider mobile device 106 and a receiver mobile device 108. Although not shown, it is contemplated that the system 100 can include substantially any number of mobile devices in addition to the provider mobile device 106 and the receiver mobile device 108.

The provider mobile device 106 can enable shared credentials 110 for a Wi-Fi network 112 to be shared with the receiver mobile device 108. Thus, the provider mobile device 106 can be utilized by a point of contact for the Wi-Fi network 112. The point of contact for the Wi-Fi network 112 can be an owner of the Wi-Fi network 112, a user appointed to control access to the Wi-Fi network 112, or the like. Further, the receiver mobile device 108 can be employed by a user with whom access to the Wi-Fi network 112 is shared (e.g., access can be shared by the point of contact for the Wi-Fi network 112).

While many of the examples set forth herein describe the system 100 including one Wi-Fi network (e.g., the Wi-Fi network 112), it is contemplated that such examples can be extended scenarios where the system 100 includes substantially any number of Wi-Fi networks. Moreover, differing users of mobile devices can be points of contact for differing Wi-Fi networks. For instance, it is to be appreciated that, with respect to a disparate Wi-Fi network (not shown), the receiver mobile device 108 can authorize providing shared credentials for such disparate Wi-Fi network to the provider mobile device 106 (e.g., the receiver mobile device 108 can be a provider mobile device for the disparate Wi-Fi network and the provider mobile device 106 can be a receiver mobile device for the disparate Wi-Fi network).

The shared credentials 110 for the Wi-Fi network 112 can be retained in the data repository 104. The shared credentials 110 can include a service set identifier (SSID), a basic service set identifier (BSSID), a network key, and so forth. For instance, the network key can be a Wired Equivalent Privacy (WEP) key, a Wi-Fi Protected Access (WPA) key, a Wi-Fi Protected Access II (WPA2) key, a Counter Cipher Mode with Block Chaining Message Authentication Code Protocol (CCMP) key, an Advanced Encryption Standard (AES) key, or the like. As an example, the shared credentials 110 for the Wi-Fi network 112 can include an SSID and WPA key that can be used by the receiver mobile device 108 to identify and access the Wi-Fi network 112 associated with the SSID. Moreover, the shared credentials 110 can be encrypted in the data repository 104. The data repository 104 can similarly retain shared credentials for disparate Wi-Fi network(s).

According to an example, the provider mobile device 106 can encrypt the shared credentials 110 for the Wi-Fi network 112. Moreover, the provider mobile device 106 can transmit the encrypted shared credentials 110 for the Wi-Fi network 112 to the server computing device 102. Following this example, the server computing device 102 can retain the shared credentials 110 in the data repository 104. However, it is to be appreciated that the shared credentials 110 can be obtained by the server computing device 102 from substantially any other source in addition to or instead of the provider mobile device 106 (e.g., a disparate computing device and/or a disparate mobile device can send the shared credentials 110 for the Wi-Fi network 112 to the server computing device 102).

Network sharing rights can be controlled by the point of contact for the Wi-Fi network 112. Thus, the provider mobile device 106 can control sharing of the Wi-Fi network 112 with disparate mobile devices (e.g., the receiver mobile device 108, disparate receiver mobile device(s)). More particularly, the provider mobile device 106 includes an authorization component 114 that can authorize providing the shared credentials 110 for the Wi-Fi network 112 to the receiver mobile device 108. The authorization component 114 can also authorize providing the shared credentials 110 for the Wi-Fi network 112 to one or more disparate receiver mobile devices (not shown).

The server computing device 102 can include a provisioning component 116 that, responsive to the authorization component 114 authorizing providing the shared credentials 110 for the Wi-Fi network 112 to the receiver mobile device 108, can make available the shared credentials 110 to the receiver mobile device 108. For instance, the provisioning component 116 can set permissions for the shared credentials 110 for the Wi-Fi network 112 to make the shared credentials 110 available to the receiver mobile device 108. Additionally or alternatively, the provisioning component 116 can include the shared credentials 110 for the Wi-Fi network 112 in an account of a user that employs the receiver mobile device 108.

The server computing device 102 can also include a delivery component 118 that transmits the shared credentials 110 for the Wi-Fi network 112 shared with the receiver mobile device 108 to the receiver mobile device 108. Upon the provisioning component 116 making the shared credentials 110 available to the receiver mobile device 108, the delivery component 118 can transmit the shared credentials 110 for the Wi-Fi network 112 to the receiver mobile device 108. For example, subsequent to the shared credentials 110 being made available to the receiver mobile device 108, the delivery component 118 can transmit the shared credentials 110 for the Wi-Fi network 112 to the receiver mobile device 108 when the receiver mobile device 108 is within geographic proximity of the Wi-Fi network 112, responsive to a physical gesture by the receiver mobile device 108 and/or the provider mobile device 106, responsive to a request received by the delivery component 118 from the receiver mobile device 108 and/or the provider mobile device 106, or so forth.

In accordance with other embodiments, it is contemplated that the authorization component 114 can provide the shared credentials for the Wi-Fi network 112 to the receiver mobile device 108 by transmitting the shared credentials to the receiver mobile device 108. Thus, the server computing device 102 need not obtain the shared credentials 110 or deliver the shared credentials 110 to the receiver mobile device 108. Yet, the claimed subject matter is not so limited.

Moreover, the Wi-Fi network 112 can provide various network resources 120. Examples of the network resources 120 of the Wi-Fi network 112 include the Internet, network attached storage, network printers, other computing devices on the Wi-Fi network 112, and so forth. The provider mobile device 106 that shares the shared credentials 110 with other mobile devices (e.g., the receiver mobile device 108) can further control rights of the other mobile devices to utilize one or more of the network resources 120. More particularly, the provider mobile device 106 can include a sharing management component 122 that provides access rights data to a network computing device 124 in the Wi-Fi network 112. Examples of the network computing device 124 in the Wi-Fi network 112 include a wireless router, a wireless access point, or the like.

The access rights data can specify a first subset of the network resources 120 of the Wi-Fi network 112 permitted to be utilized by the receiver mobile device 108 when the receiver mobile device 108 connects to the Wi-Fi network 112 using the shared credentials 110. Moreover, the access rights data can specify a second subset of the network resources 120 of the Wi-Fi network 112 inhibited from being utilized by the receiver mobile device 108 when the receiver mobile device 108 connects to the Wi-Fi network 112 using the shared credentials 110. According to an illustration, the sharing management component 122 can provide access rights data that specifies that the shared credentials 110 enable Internet-only access on the Wi-Fi network 112 for the receiver mobile device 108.

The access rights data provided by the sharing management component 122 can specify common subsets of the network resources 120 of the Wi-Fi network 112 permitted and inhibited from being utilized by receiver mobile devices (e.g., the receiver mobile device 108 and disparate receiver mobile device(s) can be permitted to utilize a common subset of the network resources 120). Additionally or alternatively, the sharing management component 122 can provide differing access rights data for differing receiver mobile devices (e.g., the receiver mobile device 108 and a disparate receiver mobile device can be permitted to utilize differing subsets of the network resources 120).

According to various embodiments, the sharing management component 122 can transmit the access rights data to the server computing device 102. The server computing device 102 can further include an access management component 126 that receives the access rights data from the provider mobile device 106. Further, the access management component 126 can transmit the access rights data to the network computing device 124 in the Wi-Fi network 112.

In accordance with other embodiments, it is contemplated that the sharing management component 122 can provide the access rights data to the network computing device 124 by transmitting the access data to the network computing device 124. Hence, the server computing device 102 need not receive the access rights data from the provider mobile device 106 or transmit the access rights data to the network computing device 124 in the Wi-Fi network. Yet, the claimed subject matter is not so limited.

The shared credentials 110 can be usable by the receiver mobile device 108 to connect to the Wi-Fi network 112. The receiver mobile device 108 can further include a network access component 128 that can connect the receiver mobile device 108 to the Wi-Fi network 112 utilizing the shared credentials received from the server computing device 102. The network access component 128 can initiate connecting to the Wi-Fi network 112 by transmitting an access request that includes the shared credentials to the network computing device 124. For instance, the network access component 128 can automatically connect the receiver mobile device 108 to the Wi-Fi network 112, connect responsive to user input, and so forth.

The network computing device 124 in the Wi-Fi network 112 can further include an admission component 130. Upon the network access component 128 of the receiver mobile device 108 initiating connection to the Wi-Fi network 112, the admission component 130 can receive the access request that includes the shared credentials for the Wi-Fi network 112 from the receiver mobile device 108. The admission component 130 can further authenticate the shared credentials for the Wi-Fi network 112 received from the receiver mobile device 108. Responsive to the authentication of the shared credentials, the admission component 130 can grant the receiver mobile device 108 access to the Wi-Fi network 112.

The network computing device 124 can also include a control component 132 that permits the receiver mobile device 108 to access the first subset of the network resources 120 of the Wi-Fi network 112, as specified by the access rights data, when the receiver mobile device 108 connects to the Wi-Fi network 112 using the shared credentials. The control component 132 further inhibits the receiver mobile device 108 from utilizing the second subset of the network resources 120 of the Wi-Fi network 112, as specified by the access rights data, when the receiver mobile device 108 connects to the Wi-Fi network 112 using the shared credentials.

The system 100 further supports exchanging message(s) between the receiver mobile device 108 and the provider mobile device 106. For instance, status messages that indicate a network condition of the Wi-Fi network 112 detected by the receiver mobile device 108 can be provided from the receiver mobile device 108 and obtained by the provider mobile device 106. Additionally or alternatively, access messages that indicate that access to the Wi-Fi network 112 by the receiver mobile device 108 is desired can be provided from the receiver mobile device 108 and obtained by the provider mobile device 106. Thus, the provider mobile device 106 can receive push notifications for access to the Wi-Fi network 112 shared by the provider mobile device 106 and/or troubleshooting notifications that indicate a problem with the Wi-Fi network 112 detected by the receiver mobile device 108, for example.

More particularly, the receiver mobile device 108 can include a resource request component 134 that generates an access message. The access message can indicate that access to the Wi-Fi network 112 by the receiver mobile device 108 is desired. The resource request component 134 can further transmit the access message to the server computing device 102.

The server computing device 102 can include a message exchange component 136 that receives the access message from the receiver mobile device 108. Moreover, the message exchange component 136 transmits the access message to the provider mobile device 106.

The provider mobile device 106 can further include a notification component 138 that receives the access message from the server computing device 102 provided by the receiver mobile device 108. The notification component 138 can render a graphical representation of the access message on a display screen of the provider mobile device 106. According to an example, the access message can indicate that it is desirable that the receiver mobile device 108 is able to connect to the Wi-Fi network 112. Responsive to displaying the graphical representation of the access message, input can be received (e.g., from a user of the provider mobile device 106), which can cause the authorization component 114 to authorize providing the shared credentials 110 for the Wi-Fi network 112 to the receiver mobile device 108. Following this example, the authorization component 114 can send, to the server computing device 102, a confirmation message that authorizes sharing the shared credentials 110 for the Wi-Fi network 112 with the receiver mobile device 108. Accordingly, the message exchange component 136 of the server computing device 102 can receive the confirmation message from the provider mobile device 106. Responsive to the reception of the confirmation message, the delivery component 118 can transmit the shared credentials 110 for the Wi-Fi network 112 to the receiver mobile device 108.

By way of another example, the access message sent by the resource request component 134 of the receiver mobile device 108 can request one or more additional network resources 120 for use by the receiver mobile device 108 (e.g., request for the receiver mobile device 108 to have access to a printer on the Wi-Fi network 112). Such access message can similarly be routed to the provider mobile device 106 and a graphical representation of the access message can be rendered on the display screen of the provider mobile device 106. Accordingly, upon receiving input responsive to the access message as displayed, the sharing management component 122 can generate updated access rights data. Similar to above, the sharing management component 122 can provide the updated access rights data to the network computing device 124.

Moreover, the receiver mobile device 108 can include a feedback component 140 that can transmit a status message from the receiver mobile device 108 to the server computing device 102. The status message can indicate a network condition of the Wi-Fi network 112 detected by the receiver mobile device 108. For instance, the status message can indicate a detected outage of the Wi-Fi network 112; yet, the claimed subject matter is not so limited. Again, the message exchange component 136 of the server computing device 102 can receive the status message from the receiver mobile device 108. The message exchange component 136 can further transmit the status message to the provider mobile device 106. The notification component 138 of the provider mobile device 106 can receive the status message from the server computing device 102 and display a graphical representation of the status message on the display screen of the provider mobile device 106.

According to other embodiments, it is contemplated that the network computing device 124 can include a message exchange component substantially similar to the message exchange component 136. Thus, messages between the provider mobile device 106 and the receiver mobile device 108 can be routed through the network computing device 124 as opposed to the server computing device 102. Yet, the claimed subject matter is not so limited.

Figure 2:
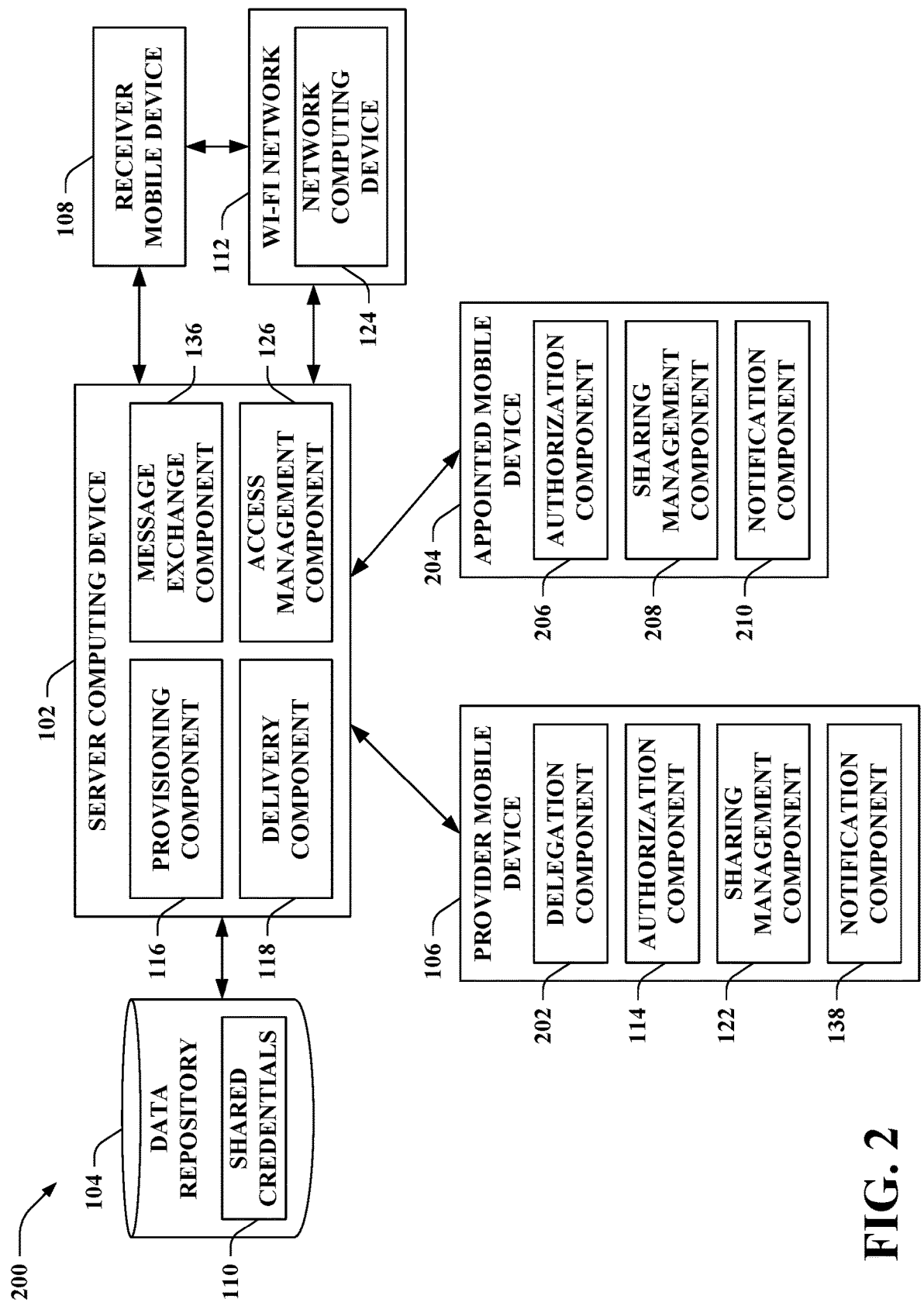
FIG. 2 illustrates a functional block diagram of an exemplary system that enables delegation of control over network sharing rights.

Now turning to FIG. 2, illustrated is a system 200 that enables delegation of control over network sharing rights. Again, the system 200 includes the server computing device 102, the data repository 104, the provider mobile device 106, receiver mobile device 108, and the Wi-Fi network 112. Moreover, the system 200 includes an appointed mobile device 204.

The appointed mobile device 204 can include an authorization component 206, a sharing management component 208, and a notification component 210, which can be substantially similar to the authorization component 114, the sharing management component 122, and the notification component 138 of the provider mobile device 106, respectively. The provider mobile device 106 further includes a delegation component 202 that assigns the appointed mobile device 204. For instance, any disparate mobile device other than the provider mobile device 106 or the receiver mobile device 108 can be assigned as the appointed mobile device 204 by the delegation component 202. The provider mobile device 106 can delegate control over sharing of the Wi-Fi network 112 to the appointed mobile device 204 by assigning the appointed mobile device 204 using the delegation component 202. Further, the delegation component 202 can selectively enable the appointed mobile device 204 to authorize providing the shared credentials 110 for the Wi-Fi network 112 and/or provide access rights data to the network computing device 124 in the Wi-Fi network 112.

According to an illustration, sharing of the Wi-Fi network 112 effectuated by the appointed mobile device 204 can be limited as compared to sharing of the Wi-Fi network 112 effectuated by the provider mobile device 106. For example, the authorization component 206 can authorize providing the shared credentials 110 for the Wi-Fi network 112 to the receiver mobile device 108, where the shared credentials 110 expire after a duration of time (e.g., the duration of time can be set by the delegation component 202, predefined, etc.). By way of another example, the delegation component 202 of the provider mobile device 106 can manage a whitelist and/or a blacklist; thus, the authorization component 206 of the appointed mobile device 204 can be restricted to providing the shared credentials 110 to one or more mobile devices included in the whitelist and/or inhibited from providing the shared credentials 110 to mobile device(s) included in the blacklist. Pursuant to yet another example, the delegation component 202 inhibits the sharing management component 208 of the appointed mobile device 204 from allowing access to one or more network resources of the Wi-Fi network 112 (e.g., the delegation component 202 can inhibit the sharing management component 208 of the appointed mobile device 204 from allowing access to a shared data store on the Wi-Fi network 112).

Moreover, the delegation component 202 can specify types of messages that can be disseminated by the message exchange component 136 of the server computing device 102 to the notification component 210 of the appointed mobile device 204. Further, the delegation component 202 can control whether messages sent by the message exchange component 136 of the server computing device 102 are also sent to the provider mobile device 106 and/or whether the notification component 138 renders graphical representations on the display screen of the provider mobile device 106 pertaining to such messages.

Figure 3:
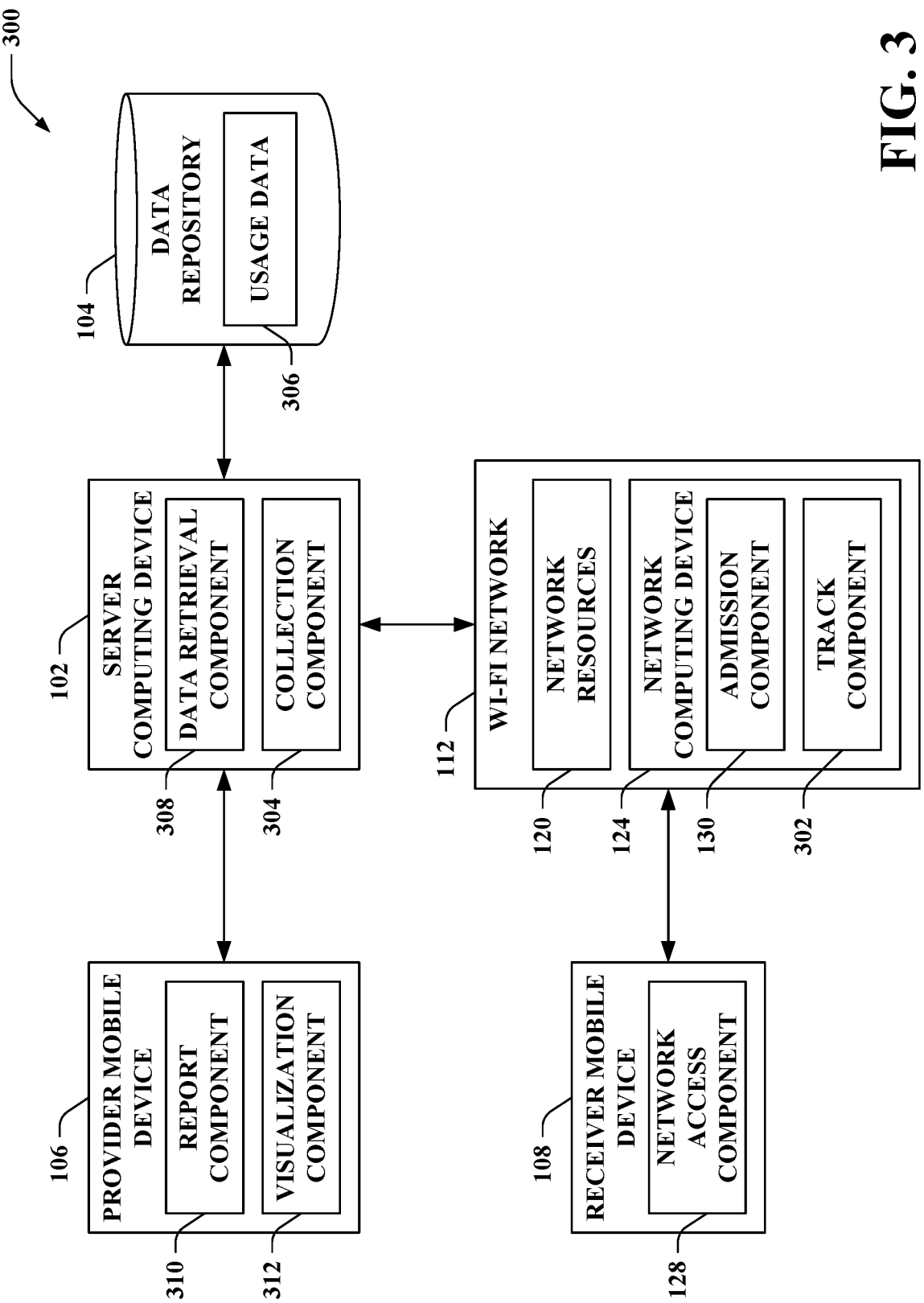
FIG. 3 illustrates a functional block diagram of an exemplary system that tracks utilization of Wi-Fi networks shared with mobile devices.

With reference to FIG. 3, illustrated is a system 300 that tracks utilization of Wi-Fi networks shared with mobile devices. The system 300 includes the server computing device 102, the data repository 104, the provider mobile device 106, and the receiver mobile device 108. Again, the provider mobile device 106 can authorize providing shared credentials for the Wi-Fi network 112. Although not shown, it is to be appreciated that the provider mobile device 106 can similarly authorize providing the shared credentials for the Wi-Fi network 112 to disparate receiver mobile devices. Likewise, the provider mobile device 106 can authorize providing shared credentials for disparate Wi-Fi network(s) other than the Wi-Fi network 112 to the receiver mobile device 108 and/or differing receiver mobile device(s). Similarly, other provider mobile device(s) can authorize providing shared credentials for Wi-Fi network(s).

As noted above, the network access component 128 of the receiver mobile device 108 can cause the receiver mobile device 108 to connect to the Wi-Fi network 112 using the shared credentials for the Wi-Fi network 112 (e.g., by transmitting an access request that includes the shared credentials for the Wi-Fi network 112). The admission component 130 of the network computing device 124 in the Wi-Fi network 112 can receive the shared credentials for the Wi-Fi network 112 from the receiver mobile device 108. The admission component 130 can further authenticate the shared credentials for the Wi-Fi network 112 received from the receiver mobile device 108. Responsive to authentication of the shared credentials, the admission component 130 can grant access to the receiver mobile device 108 for the Wi-Fi network 112.

The system 300 can track Wi-Fi usage. For instance, the Wi-Fi usage can be tracked for legal traceability (e.g., to determine who downloaded illegal content) and/or for regulatory compliance. Moreover, dashboards can be generated and displayed to present graphical representations of usage of Wi-Fi network(s) shared by the provider mobile device 106 and/or usage of Wi-Fi networks by the provider mobile device 106 (e.g., Wi-Fi networks shared with the provider mobile device 106). By way of another example, the usage of Wi-Fi networks can be analyzed, and incentives (e.g., incentives to share a Wi-Fi network with other mobile device(s), incentives to use a Wi-Fi network shared by another mobile device, etc.) can be provided based upon the analysis of the usage.

The network computing device 124 can further include a track component 302 that monitors utilization of the Wi-Fi network 112 by the receiver mobile device 108. The track component 302 monitors historic utilization of the Wi-Fi network 112 by the receiver mobile device 108. For instance, the track component 302 can transmit data indicative of the historic utilization of the Wi-Fi network 112 by the receiver mobile device 108 to the server computing device 102. Additionally or alternatively, the track component 302 can retain the data indicative of the historic utilization of the Wi-Fi network 112 by the receiver mobile device 108 in a data repository included in the Wi-Fi network 112 (as depicted below in the exemplary embodiment of FIG. 4).

The server computing device 102 can further include a collection component 304 that receives, from the network computing device 124 in the Wi-Fi network 112, the data indicative of historic utilization of the Wi-Fi network 112 by the receiver mobile device 108 tracked by the network computing device 124 (e.g., the track component 302). The collection component 304 can retain the data indicative of the historic utilization of the Wi-Fi network 112 by the receiver mobile device 108 tracked by the network computing device 124 as part of usage data 306 in the data repository 104. The usage data 306 can be indicative of historic utilization of Wi-Fi networks by receiver mobile devices. Moreover, the collection component 304 can further receive, from the network computing device 124 in the Wi-Fi network 112, data indicative of historic utilization of the Wi-Fi network 112 by disparate receiver mobile devices tracked by the network computing device 124, which can be retained as part of the usage data 306 in the data repository 104. The collection component 304 can also receive, from disparate network computing devices in disparate Wi-Fi networks, data indicative of historic utilization of such disparate Wi-Fi networks tracked by the disparate network computing devices, which can similarly be retained as part of the usage data 306 in the data repository 104.

While the usage data 306 is described as being retained in the data repository 104 (e.g., which is described herein as retaining shared credentials for Wi-Fi networks), it is to be appreciated that the usage data 306 and the shared credentials can be retained in a differing data repositories.

The server computing device 102 can include a data retrieval component 308 that can receive a request to retrieve at least a portion of the usage data 306 retained in the data repository 104. Moreover, the data retrieval component 308 can execute a search based upon the request to retrieve the portion of the usage data 306 from the data repository 104. The data retrieval component 308 can further return the portion of the usage data 306 in response to the request.

According to an example, the request received by the data retrieval component 308 can be obtained from the provider mobile device 106. Yet, it is to be appreciated that substantially any other source can provide the request received by the data retrieval component 308 (e.g., the server computing device 102 can provide the request, the receiver mobile device 108 can provide the request, the receiver mobile device 108 can provide the request, the network computing device 124 can provide the request, substantially any other computing device can provide the request, etc.). For instance, the request received by the data retrieval component 308 can be from a computing device for law enforcement purposes (e.g., to determine an identity of a user who used the Wi-Fi network 112 during a given time period).

According to various embodiments, the provider mobile device 106 can send the request to the data retrieval component 308 of the server computing device 102. In accordance with such embodiments, the provider mobile device 106 can include a report component 310. The report component 310 can transmit, to the server computing device 102, the request to retrieve usage data. Moreover, the report component 310 can receive the usage data retrieved by the data retrieval component 308 of the server computing device 102 responsive to the request. The provider mobile device 106 can further include a visualization component 312 that renders a dashboard on a display screen of the provider mobile device 106. The dashboard rendered by the visualization component 312 can include a graphical representation of the usage data received by the report component 310.

According to an illustration, the report component 310 can transmit, to the server computing device 102, a request to retrieve usage data indicative of historic utilization of the Wi-Fi network 112 by at least the receiver mobile device 108. Accordingly, the data retrieval component 308 can receive such request, execute a search based upon the request, and return the portion of the usage data 306 indicative of the historic utilization of the Wi-Fi network 112 by at least the receiver mobile device 108. Thus, the report component 310 can receive the usage data indicative of the historic utilization of the Wi-Fi network 112 by at least the receiver mobile device 108. Further, the visualization component 312 can render a dashboard on the provider mobile device 106, where the dashboard includes a graphical representation of the usage data indicative of the historic utilization of the Wi-Fi network 112 by at least the receiver mobile device 108. The dashboard displayed on the display screen of the provider mobile device 106 can enable visualizing utilization of the Wi-Fi network 112 shared by the provider mobile device 106 by other mobile device(s). For instance, the dashboard can show who used the Wi-Fi network 112, how much bandwidth was used by other users, attributes of the users who used the Wi-Fi network 112, and so forth.

Additionally or alternatively, the report component 310 can transmit, to the server computing device 102, a request to retrieve usage data indicative of historic utilization of at least one disparate Wi-Fi network (not shown) by the provider mobile device 106. The data retrieval component 308 can receive such request for the portion of the usage data 306 retained in the data repository 104 indicative of the historic utilization of the at least one disparate Wi-Fi network by the provider mobile device 106. Responsive to executing a search based upon the request, the data retrieval component 308 can return the portion of the usage data 306 indicative of the historic utilization of the at least one disparate Wi-Fi network by the provider mobile device 106 to the provider mobile device 106. Accordingly, the report component 310, responsive to the request, can receive the usage data indicative of the historic utilization of the at least one disparate Wi-Fi network by the provider mobile device 106. The visualization component 312 can further render a dashboard on the display screen of the provider mobile device 106, where the dashboard includes a graphical representation of the usage data indicative of historic utilization of the at least one disparate Wi-Fi network by the provider mobile device 106. Thus, the dashboard can show usage of shared Wi-Fi network(s), shared by other users and used by the user of the provider mobile device 106.

Figure 4:
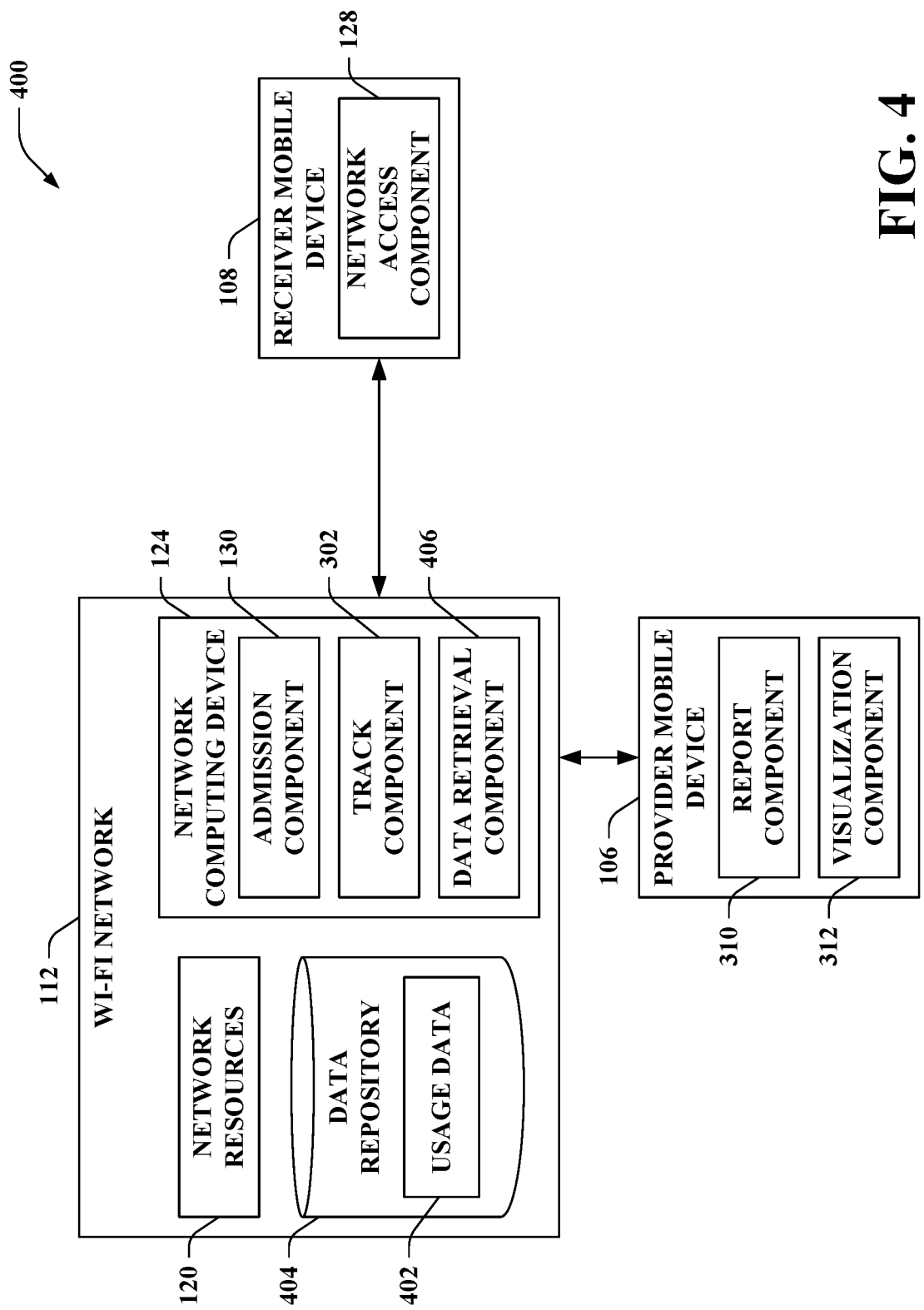
FIG. 4 illustrates a functional block diagram of an exemplary system that tracks utilization of a Wi-Fi network and retains usage data in a data repository included in the Wi-Fi network.

With reference to FIG. 4, illustrated is a system 400 that tracks utilization of the Wi-Fi network 112 and retains usage data 402 in a data repository 404 included in the Wi-Fi network 112. Again, the system 400 includes the provider mobile device 106 and the receiver mobile device 108. In the embodiment shown in FIG. 4, the track component 302 can monitor utilization of the Wi-Fi network 112 by the receiver mobile device 108 (and other receiver mobile device(s)). Further, the track component 302 can retain data indicative of the historic utilization by the receiver mobile device 108 (and other receiver mobile device(s)) in the data repository 404 as the usage data 402. Thus, the usage data 402 retained in the data repository 404 by the track component 302 can be indicative of historic utilization of the Wi-Fi network 112 by the receiver mobile device 108, as well as disparate receiver mobile device(s), with which the provider mobile device 106 shares the credentials.

The network computing device 124 can further include a data retrieval component 406, which can be substantially similar to the data retrieval component 308 to FIG. 3. Accordingly, the report component 310 of the provider mobile device 106 can transmit, to the network computing device 124, a request to retrieve usage data 402 (or a portion thereof) from the data repository 404 in the Wi-Fi network 112. In response to the request, the data retrieval component 406 can execute a search based upon the request for the portion of the usage data 402 from the data repository 404 specified by the request, and return the portion of the usage data 402 to the provider mobile device 106. The report component 310 can receive the portion of the usage data, and the visualization component 312 can generate a graphical representation of the received usage data, which can be displayed as part of a dashboard on the display screen of the provider mobile device 106.

Figure 5:
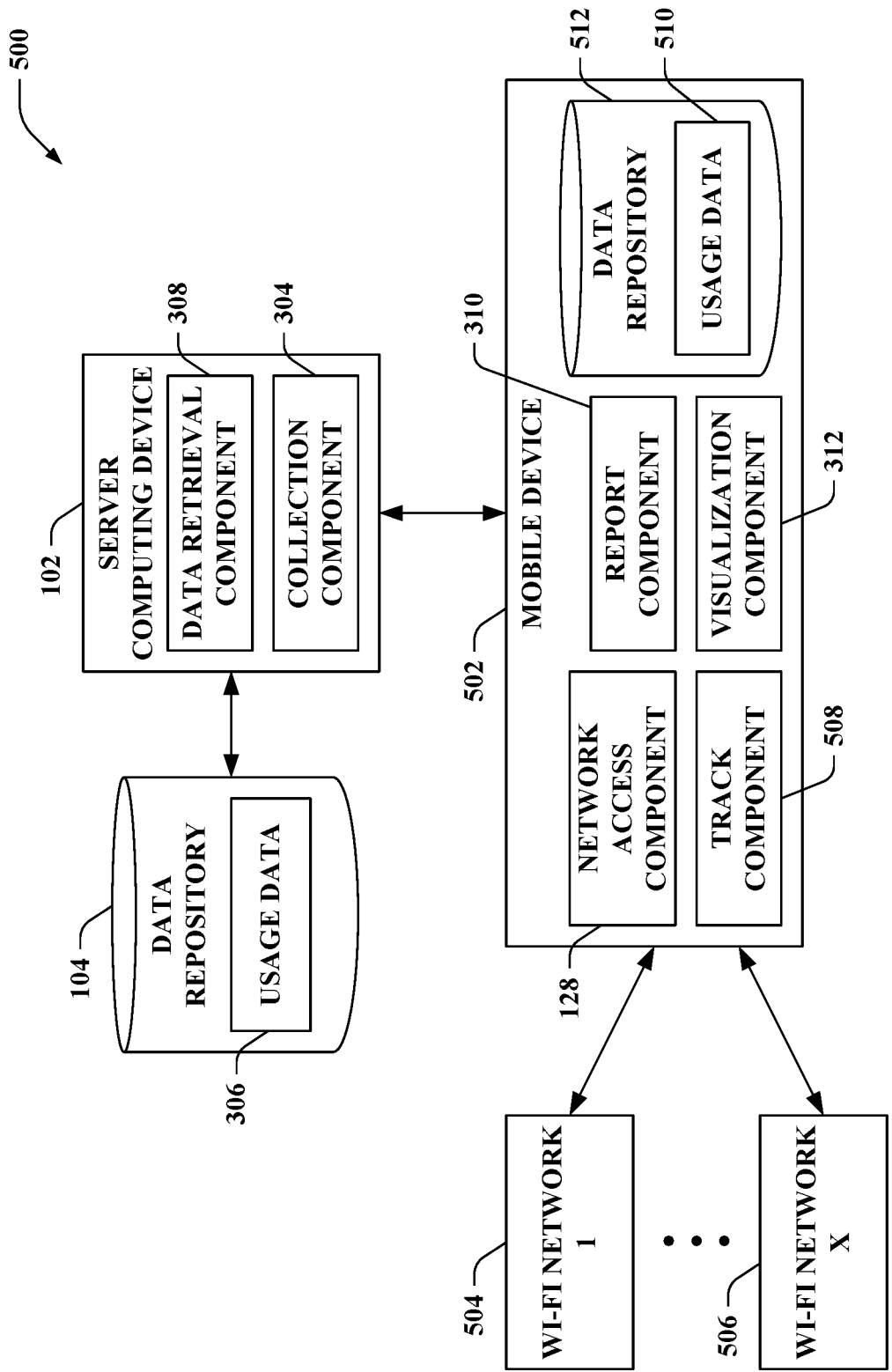
FIG. 5 illustrates a functional block diagram of an exemplary system that tracks utilization of Wi-Fi networks from a mobile device.

Now turning to FIG. 5, illustrated is a system 500 that tracks utilization of Wi-Fi networks from a mobile device 502. The mobile device 502, for instance, can be the provider mobile device 106 or the receiver mobile device 108 of FIG. 1. The system 500 further includes the server computing device 102 and the data repository 104.

The mobile device 502 includes the network access component 128. The network access component 128 can connect the mobile device 502 to one or more Wi-Fi networks utilizing respective shared credentials for the Wi-Fi networks. For instance, the network access component 128 can connect the mobile device 502 to a Wi-Fi network 1 504, . . . , and a Wi-Fi network X 506, where X can be substantially any integer (collectively referred to herein as Wi-Fi networks 504-506).

The mobile device 502 can further include the track component 508, which can be substantially similar to the track component 302 of FIG. 3. The track component 508 can monitor historic utilization of the one or more Wi-Fi networks 504-506 by the mobile device 502. The track component 508 can retain usage data 510 indicative of the historic utilization of the one or more Wi-Fi networks 504-506 by the mobile device 502 in a data repository 512 of the mobile device 502.

The track component 508 can further transmit the usage data 510 indicative of the historic utilization of the one or more Wi-Fi networks 504-506 by the mobile device 502 to the server computing device 102. Thus, the collection component 304 can receive, from the mobile device 502, the data indicative of the historic utilization of the Wi-Fi networks 504-506 by the mobile device 502 tracked by the mobile device 502. The collection component 304 can further retain the data indicative of the historic utilization of the one or more Wi-Fi networks 504-506 by the mobile device 502 tracked by the mobile device 502 as part of the usage data 306 in the data repository 104.

Moreover, the mobile device 502 can include the report component 310 and the visualization component 312. It is to be appreciated that the report component 310 can send a request to the server computing device 102 (e.g., the data retrieval component 308) to obtain usage data 306 (or a portion thereof) from the data repository 104 and/or execute a search for at least a portion of the usage data 510 retained in the data repository 512. Further, the visualization component 312 can generate a graphical representation and render such graphical representation as part of a dashboard on the display screen of the mobile device 502 based upon the usage data obtained by the report component 310.

Figure 6:
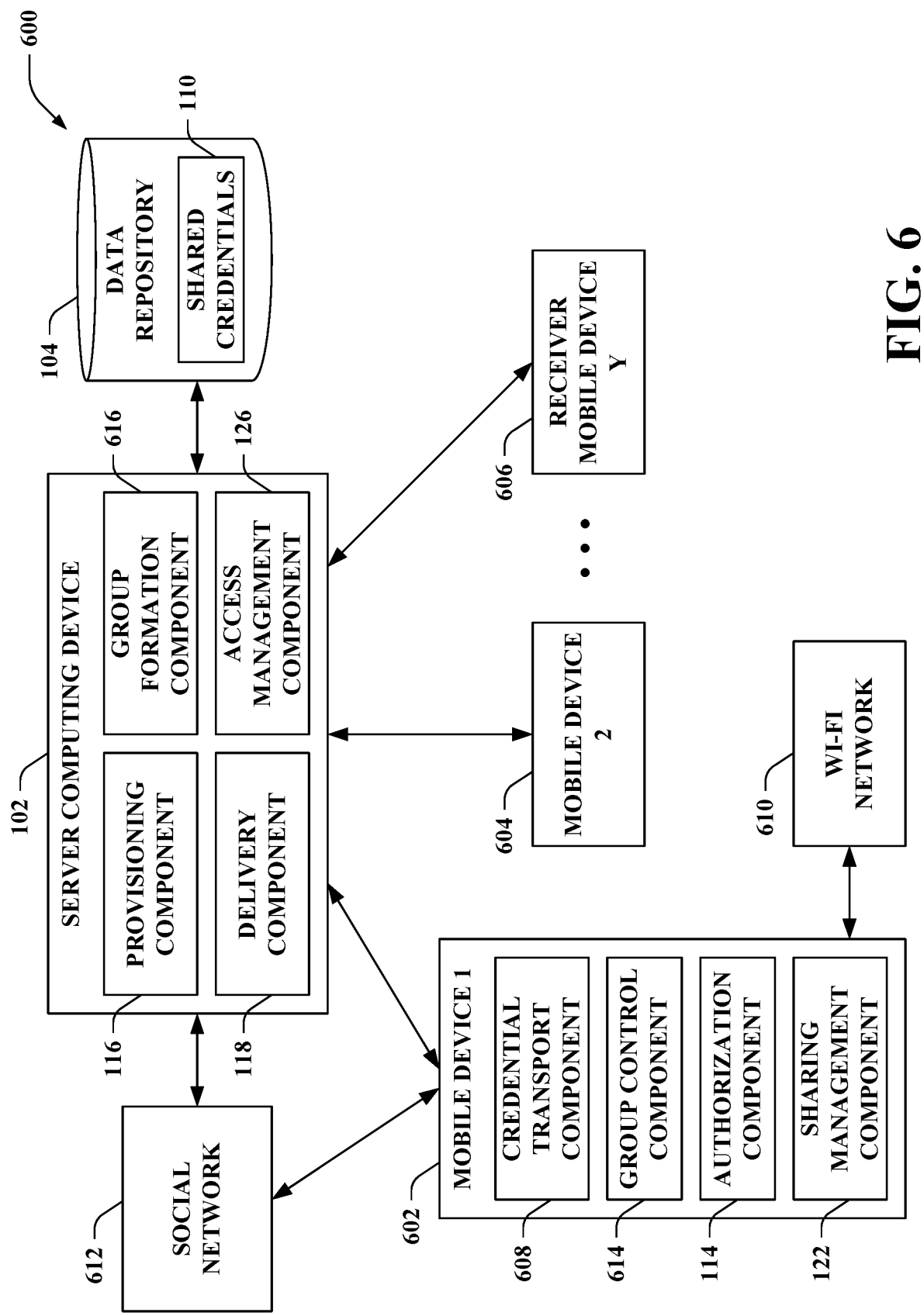
FIG. 6 illustrates a functional block diagram of an exemplary system that forms a group for sharing credentials for Wi-Fi networks.

Turning to FIG. 6, illustrated is a system 600 that forms a group for sharing credentials for Wi-Fi networks. The system 600 includes the server component 102 and the data repository 104, which can retain the shared credentials 110. Again, the server computing device 102 can include the provisioning component 116, the delivery component 118, and the access management component 126. The system 600 further includes a plurality of mobile devices, namely, a mobile device 1 602, a mobile device 2 604, . . . , and a mobile device Y 606, where Y can be substantially any integer greater than two (collectively referred to herein as mobile devices 602-606). It is contemplated that each of the mobile devices 602-606 can be substantially similar to the provider mobile device 106 and/or the receiver mobile device 108.

The mobile device 1 602 can include a credential transport component 608 that encrypts credentials for a Wi-Fi network 610 (e.g., the Wi-Fi network 112). Moreover, the credential transport component 608 transmits the encrypted credentials for the Wi-Fi network 610 to the server computing device 102. The server computing device 102 can retain the credentials received from the mobile device 1 602 in the data repository 104 as the shared credentials 110. However, it is to be appreciated that the shared credentials 110 can be obtained by the server computing device 102 in substantially any other manner and need not be provided by the mobile device 1 602. Moreover, the shared credentials 110 retained in the data repository 104 can include credentials for substantially any number of disparate Wi-Fi networks in addition to the Wi-Fi network 610.

The mobile device 1 602 can further include the authorization component 114 and the sharing management component 122. The authorization component 114 authorizes providing the shared credentials 110 for the Wi-Fi network 610 to one or more of the mobile devices 604-606. Further, the sharing management component 122 provides access rights data to a network computing device in the Wi-Fi network 610 for controlling access to various network resources of the Wi-Fi network 610 by the one or more mobile devices 604-606.

Pursuant to an example, Wi-Fi networks can be shared on a per network basis. Accordingly, the authorization component 114 can authorize providing shared credentials for the Wi-Fi network 610 while inhibiting providing shared credentials for a disparate Wi-Fi network (not shown). By way of another example, a mobile device (e.g., the mobile devices 602-606) can either opt-in or opt-out of sharing credentials for Wi-Fi networks that are sharable by the mobile device.

According to an example, the authorization component 114 can authorize providing the shared credentials 110 for the Wi-Fi network 610 to a receiver mobile device (e.g., one or more of the mobile devices 604-606) based upon relationships in a computer-implemented social network 612. For instance, the authorization component 114 can enable sharing the shared credentials 110 for the Wi-Fi network 610 with the receiver mobile device of contacts of a user of the mobile device 1 602 from the social network 612. Hence, when the user of the mobile device 1 602 forms a relationship with a user of the receiver mobile device in the social network 612, the authorization component 114 can authorize providing the shared credentials 110 for the Wi-Fi network 610 to such receiver mobile device.

According to another example, the authorization component 114 can authorize providing the shared credentials 110 for the Wi-Fi network 610 to the receiver mobile device (e.g., one or more of the mobile devices 604-606) upon the mobile device 1 602 joining the Wi-Fi network 610. Hence, when the mobile device 1 602 obtains credentials for the Wi-Fi network 610 that are shareable with disparate mobile device(s), the authorization component 114 can authorize providing the shared credentials 110 for the Wi-Fi network 610 to the receiver mobile device.

Pursuant to yet another example, the authorization component 114 can authorize providing the shared credentials 110 for the Wi-Fi network 610 to the receiver mobile device (e.g., one or more of the mobile devices 604-606) when a user of the mobile device 1 602 joins a group of users. Wi-Fi credentials, for instance, can be shared between the users in the group. In addition to including the user of the mobile device 1 602, the group can include user(s) of one or more of the mobile devices 604-606 (e.g., user(s) of receiver mobile device(s)).

According to various embodiments, the server computing device 102 can form a group of users between whom Wi-Fi credentials are shared. In accordance with other embodiments, a mobile device (e.g., the mobile device 1 602) can form a group of users between whom Wi-Fi credentials are shared. Moreover, it is contemplated that the group of users can be formed by the server computing device 102 and one or more of the mobile devices 602-606.

The mobile device 1 602, for example, can include a group control component 614 that can create a group and manage membership of the users in the group. The group, for instance, can be formed from a tile on the mobile device 1 602; yet, the claimed subject matter is not so limited. Moreover, the group control component 614 can receive a recommendation from the server computing device 102, and the group control component 614 can manage membership in the group based upon the recommendation.

The server computing device 102 can include a group formation component 616 that can generate the recommendation. The recommendation, for example, can suggest a given user to include in the group, whether to enable the Wi-Fi network 610 to be shared with the group, a particular network resource of the Wi-Fi network 610 to share with the group, and so forth. Such recommendation can be transmitted from the server computing device 102 to the mobile device 1 602. Accordingly, the group control component 614 can receive the recommendation from the server computing device 102.

Moreover, in addition to or instead of generating the recommendation, the group formation component 616 of the server computing device 102 can form a group of users between whom Wi-Fi credentials are shared. The group formation component 616 can further identify a set of mobile devices employed by the users included in the group. For instance, a set of mobile devices employed by the users included in the group can be a subset of the mobile devices 602-606. Further, the delivery component 118 can transmit the shared credentials 110 for the Wi-Fi network 610 shared by the mobile device 1 602 to remaining mobile devices in the set of mobile devices identified by the group formation component 616.

The group formation component 616 can form the group of users between whom the Wi-Fi credentials are shared (or generate the recommendation) based upon shared calendars of the users, participation of the users in an event, geographic locations of the mobile devices employed by the users, interest profiles of the users, a combination thereof, and so forth. Moreover, the group formation component 616 can create the group (or generate the recommendation) by mining data from electronic wallets or transactions associated with the mobile devices 602-606. By way of example, the group formation component 616 can automatically find users similar to the user forming the group (e.g., the user of the mobile device 1 602 that initiates creating the group utilizing the group control component 614); yet, the claimed subject matter is not so limited. According to other examples, it is contemplated that he group control component 614 and/or the group formation component 616 can use whitelists and/or blacklists to manage group membership.

Figure 7:
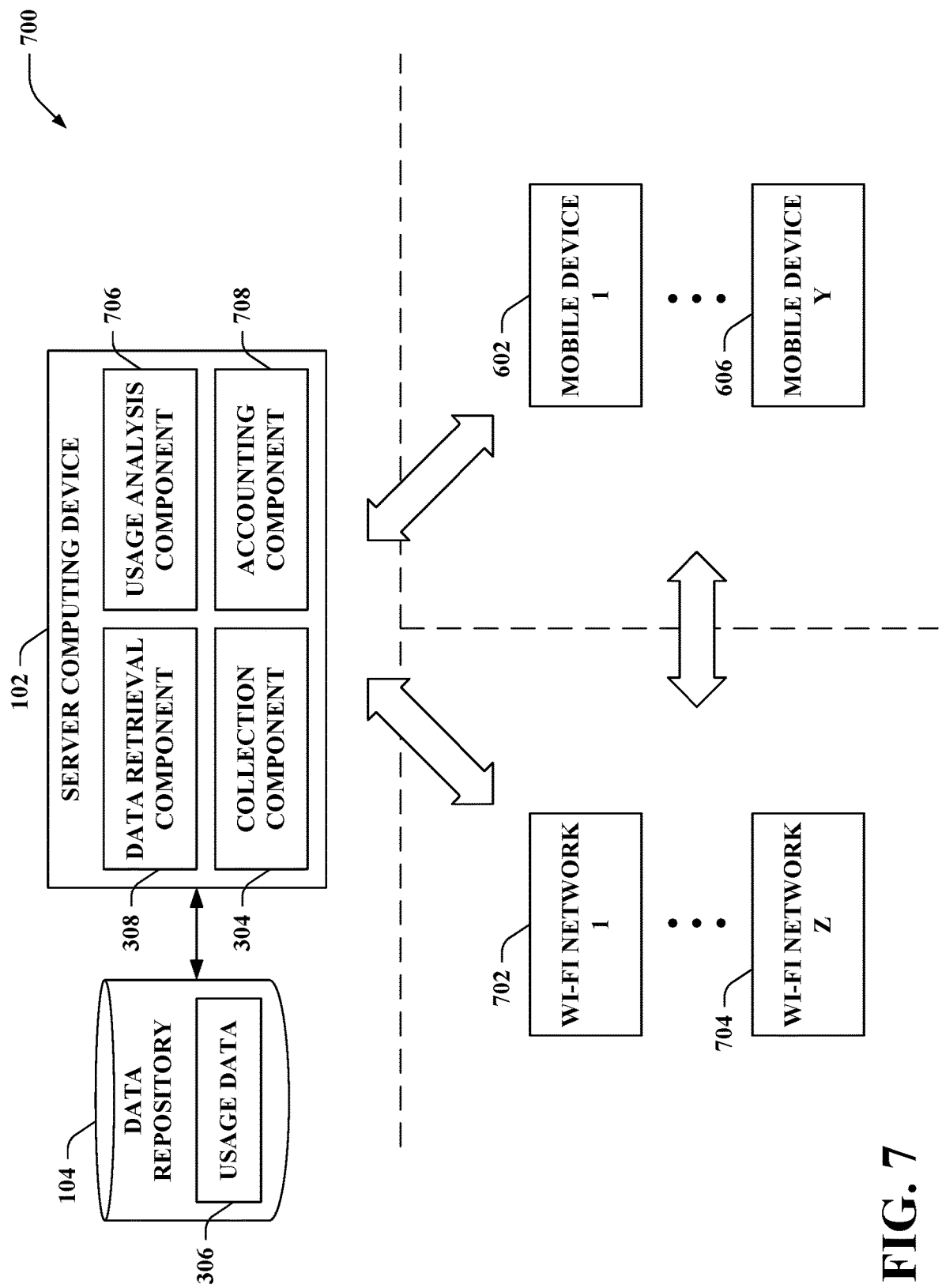
FIG. 7 illustrates a functional block diagram of an exemplary system that evaluates usage data retained in a data repository and provides incentives based upon the evaluation of the usage data.

With reference to FIG. 7, illustrated is a system 700 that evaluates the usage data 306 retained in the data repository 104 and provides incentives based upon the evaluation of the usage data 306. The system 700 includes the server computing device 102, the data repository 104, and the mobile devices 602-606. The system 700 further includes a plurality of Wi-Fi networks from which data indicative of historic utilization by the mobile devices 602-606 can be received, where such data can be received and retained in the data repository 104 as part of the usage data 306 by the collection component 304 of the server computing device 104. The plurality of Wi-Fi networks can include a Wi-Fi network 1 702, . . . , and a Wi-Fi network Z 704, where Z can be substantially any integer (collectively referred to herein as Wi-Fi networks 702-704).

Incentives can be offered to cause users to share Wi-Fi networks 702-704 or cause users (e.g., employing the mobile devices 602-606) to access shared Wi-Fi networks 702-704 shared by other users. For instance, the server computing device 102 can include the data retrieval component 308, which can retrieve the usage data 306 (or a portion thereof) from the data repository 104 responsive to a request. Moreover, the server computing device 102 can include a usage analysis component 706, which can generate the request. The usage analysis component 706 can receive and evaluate the usage data returned responsive to the request. For example, the usage analysis component 706 can determine amounts of bandwidth used by the mobile devices 602-606 and amounts of bandwidth shared by the Wi-Fi networks 702-704 based upon the usage data returned responsive to the request; however, it is contemplated that substantially any other type of parameter pertaining to the usage data can be analyzed by the usage analysis component 706.

The server computing device 102 can further include an accounting component 708 that can provide credits for money, merchandise, quality of service (QoS), etc. based upon the analysis performed by the usage analysis component 706. For instance, a user can be net metered (e.g., amount of shared bandwidth provided minus amount of shared bandwidth consumed for sharing connectivity) by the usage analysis component 706, and credits or debits from an account of the user can be managed by the accounting component 708 based upon the net metering.

According to an example, the credits can be reconciled based upon relationships within a social network. Moreover, benefits associated with being part of a group or reputations of groups can be available for inspection by mobile devices (e.g., prior to joining the groups). By way of example, a number of members included in the group, Wi-Fi networks shared by the members of the group, coverage of the Wi-Fi network shared by the members of the group, etc. can be available for inspection. Further, a visual indication of a network rating or shared attributes can be displayed on a display screen of a mobile device. Pursuant to another example, a creator of a group can earn added credits for forming the group.

By way of other examples, gamification can be implemented based upon the evaluation performed by the usage analysis component 706. For instance, badges can be provided to users based upon amounts of bandwidth provided or consumed (e.g., greatest amount shared, greatest amount consumed, amount shared or consumed above a threshold, etc.). Moreover, badges can be issued based upon attributes of others that access a shared Wi-Fi network of a user (e.g., a badge can be earned by a given user when a celebrity is observed to have connected to a Wi-Fi network of the given user, etc.). According to another example, users can be rated based upon number of distinct Wi-Fi networks to which they have connected and/or number of users that have connected to Wi-Fi networks they have shared.

FIGS. 8-11 illustrate exemplary methodologies relating to utilizing shared Wi-Fi. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 8:
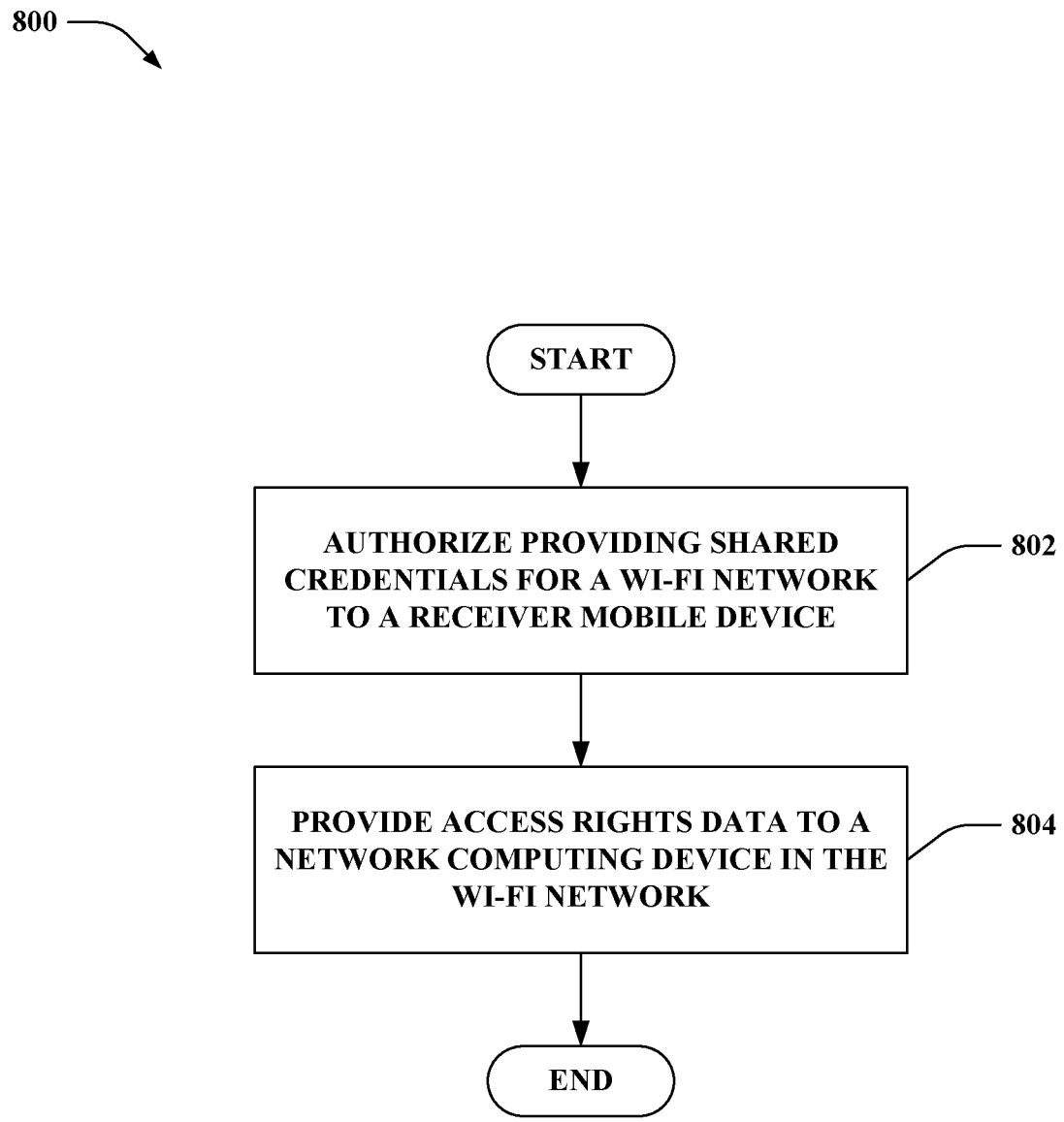
FIG. 8 is a flow diagram that illustrates an exemplary methodology for sharing a Wi-Fi network from a mobile device.

FIG. 8 illustrates a methodology 800 for sharing a Wi-Fi network from a mobile device. At 802, providing shared credentials for the Wi-Fi network to a receiver mobile device can be authorized. The shared credentials can be usable by the receiver mobile device to connect to the Wi-Fi network. By way of example, the mobile device can deliver the shared credentials for the Wi-Fi network to the receiver mobile device response to authorizing the providing of the shared credentials to the receiver mobile device. According to another example, one or more server computing devices can deliver the shared credentials for the Wi-Fi network to the receiver mobile device response to authorizing the providing of the shared credentials to the receiver mobile device.

At 804, access rights data can be provided to a network computing device in the Wi-Fi network. The access rights data can specify a first subset of network resources of the Wi-Fi network permitted for utilization by the receiver mobile device when the receiver mobile device connects to the Wi-Fi network using the shared credentials. Moreover, the access rights data can specify a second subset of the network resources of the Wi-Fi network inhibited from being utilized by the receiver mobile device when the receiver mobile device connects to the Wi-Fi network using the shared credentials. Pursuant to an example, the access rights data can be provided to the network computing device in the Wi-Fi network by the mobile device transmitting the access rights data to the network computing device in the Wi-Fi network. By way of another example, the access rights data can be provided to the network computing device in the Wi-Fi network by the mobile device transmitting the access rights data to one or more server computing devices, and the one or more server computing devices transmitting the access rights data to the network computing device.

Figure 9:
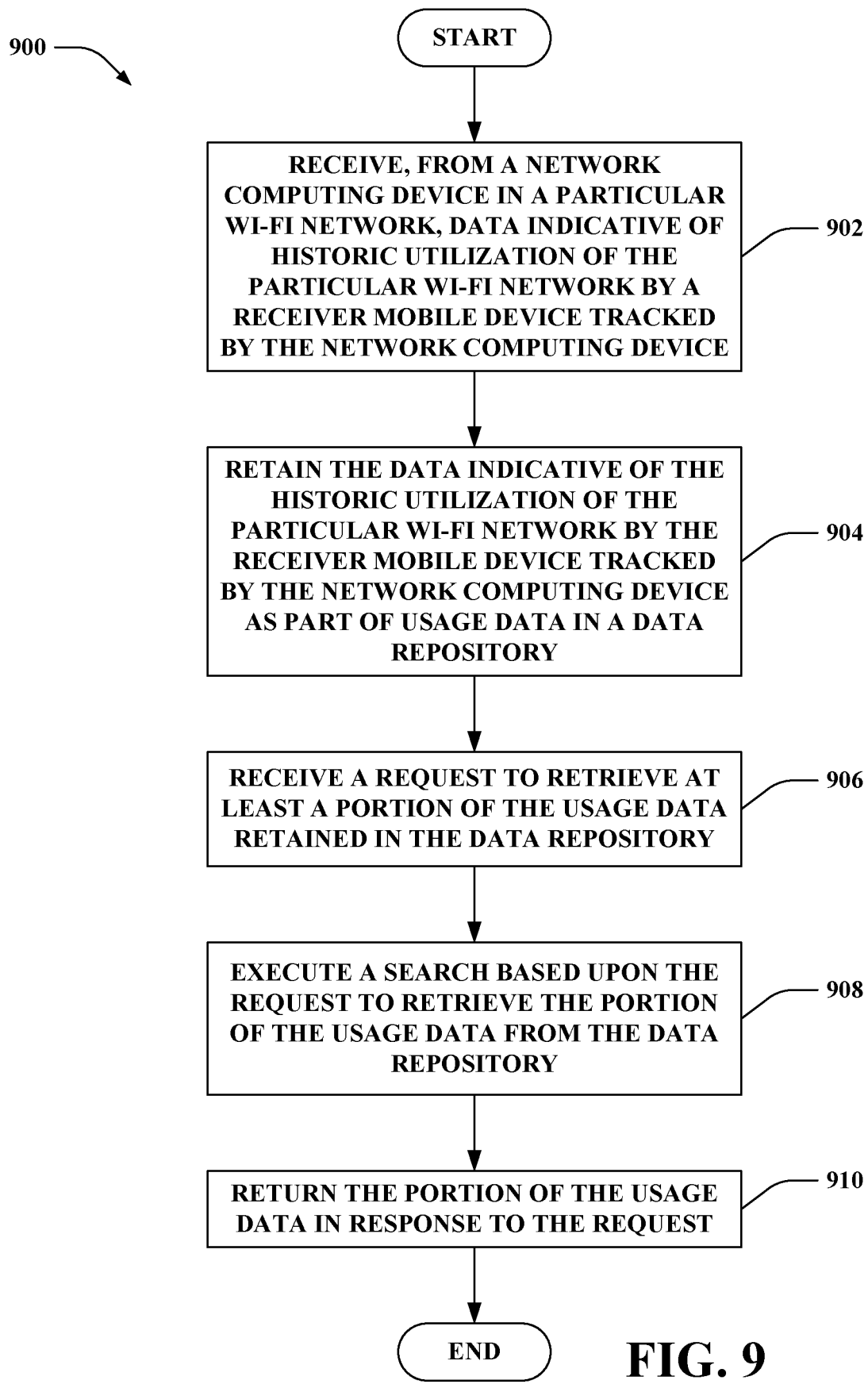
FIG. 9 is a flow diagram that illustrates an exemplary methodology for tracking historic shared Wi-Fi network usage.

Turning to FIG. 9, illustrated is a methodology 900 for tracking historic shared Wi-Fi network usage. The methodology 900 can be executed by at least one server computing device. At 902, data can be received by the server computing device from a network computing device in a particular Wi-Fi network. The data can be indicative of historic utilization of the particular Wi-Fi network by a receiver mobile device tracked by the network computing device. The receiver mobile device can use shared credentials for the particular Wi-Fi network to access the particular Wi-Fi network, and the shared credentials can be shared with the receiver mobile device by a provider mobile device. At 904, the data indicative of the historic utilization of the particular Wi-Fi network by the receiver mobile device tracked by the network computing device can be retained as part of usage data in a data repository. The usage data can be indicative of historic utilization of Wi-Fi networks by receiver mobile devices. At 906, a request to retrieve at least a portion of the usage data retained in the data repository can be received. At 908, a search can be executed based upon the request to retrieve the portion of the usage data from the data repository. At 910, the portion of the usage data can be returned in response to the request.

Figure 10:
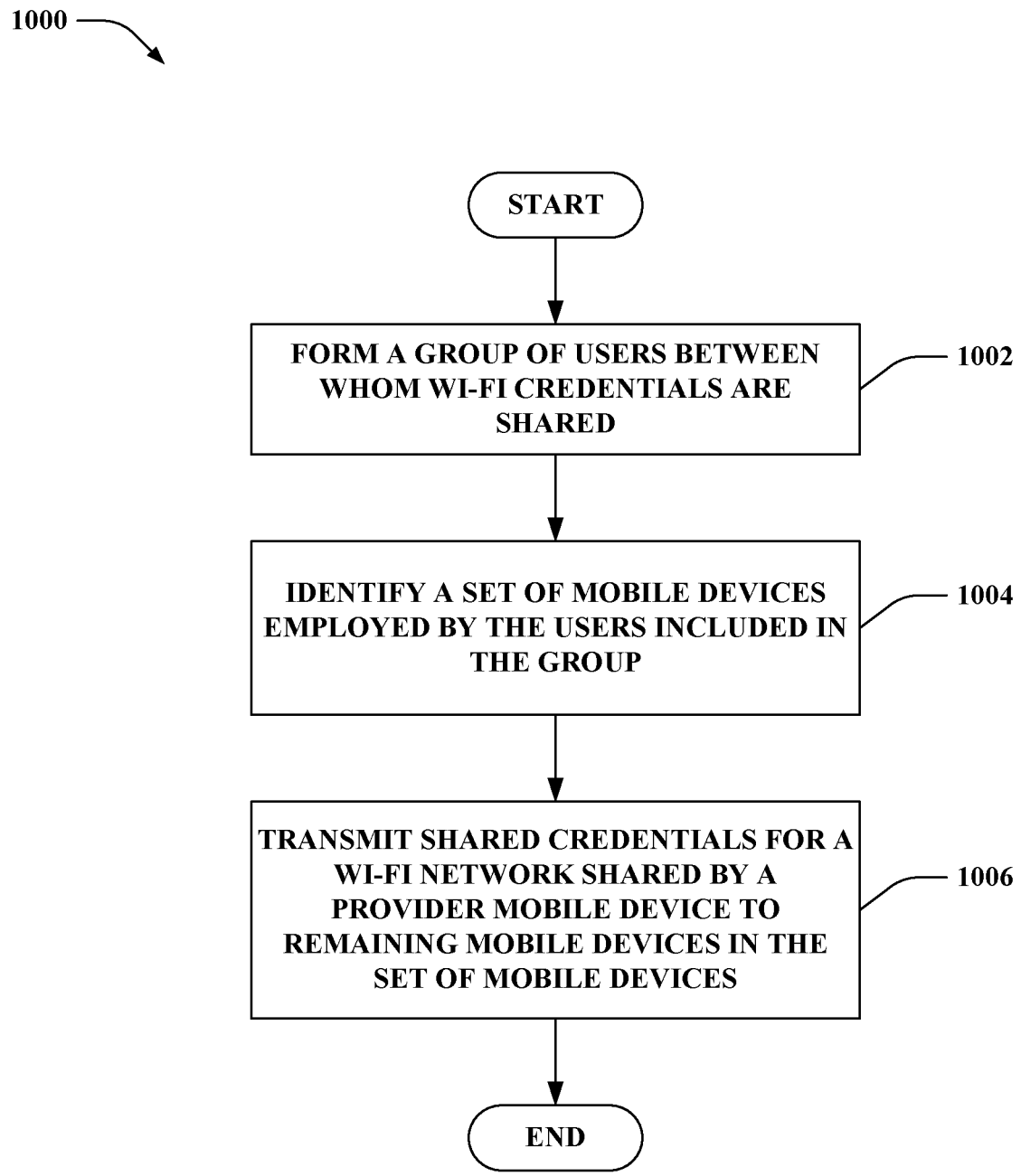
FIG. 10 is a flow diagram that illustrates an exemplary methodology for forming a group for sharing Wi-Fi credentials.

With reference to FIG. 10, illustrated is a methodology 1000 for forming a group for sharing Wi-Fi credentials. The methodology 1000 can be executed by at least one server computing device. At 1002, a group of users between whom Wi-Fi credentials are shared can be formed. At 1004, a set of mobile devices employed by the users included in the group can be identified. At 1006, shared credentials for a Wi-Fi network shared by a provider mobile device can be transmitted to remaining mobile devices in the set of mobile devices.

Figure 11:
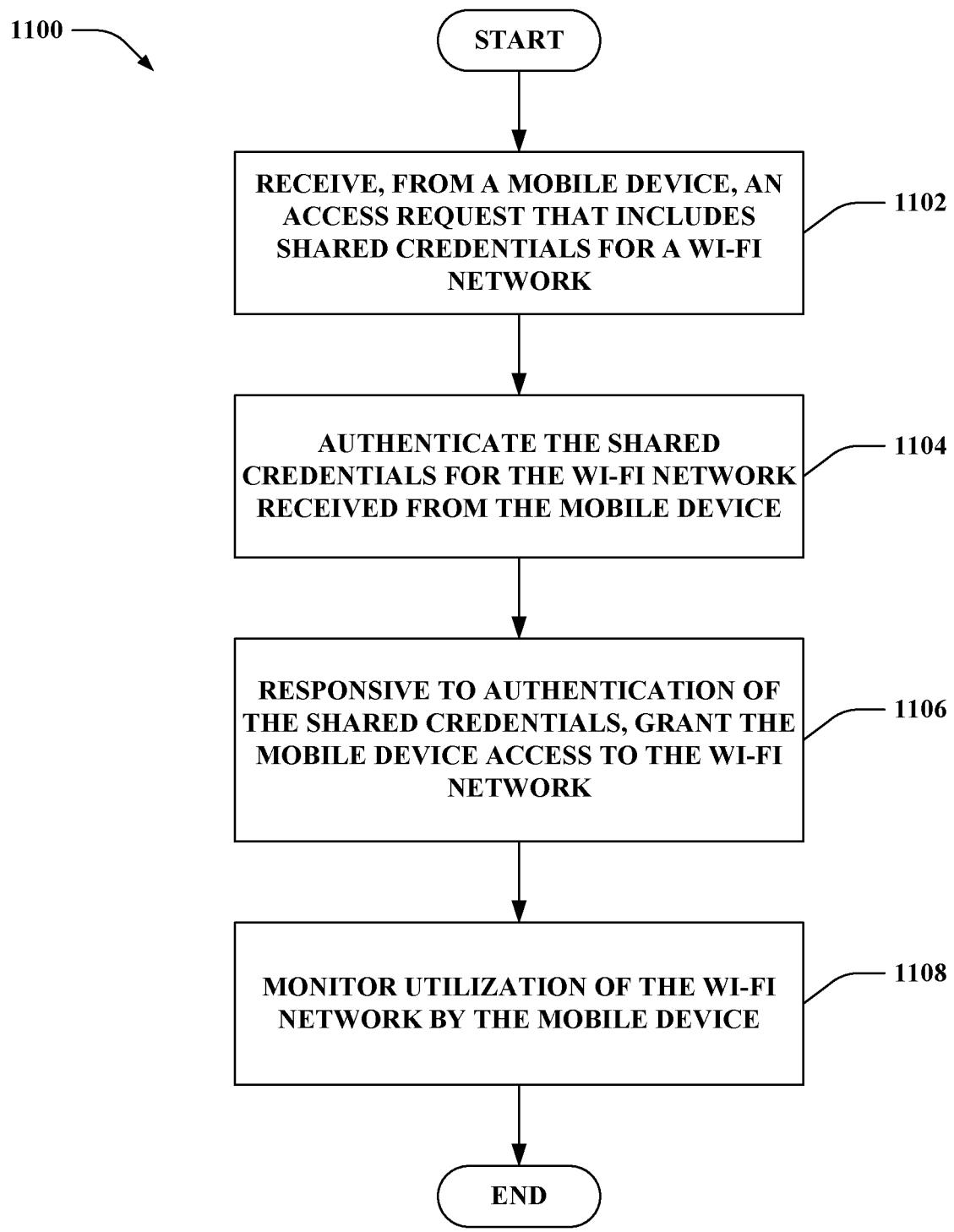
FIG. 11 is a flow diagram that illustrates an exemplary methodology executed by a network computing device in a Wi-Fi network.

With reference to FIG. 11, illustrated is a methodology 1100 executed by a network computing device in a Wi-Fi network. At 1102, an access request that includes shared credentials for a Wi-Fi network can be received from a mobile device. At 1104, the shared credentials for the Wi-Fi network received from the mobile device can be authenticated. At 1106, responsive to authentication of the shared credentials, the mobile device can be granted access to the Wi-Fi network. At 1108, utilization of the Wi-Fi network by the mobile device can be monitored. Data indicative of the utilization of the Wi-Fi network by the mobile device, for example, can be retained in a data repository, transmitted to one or more server computing devices, of a combination thereof.

Figure 12:
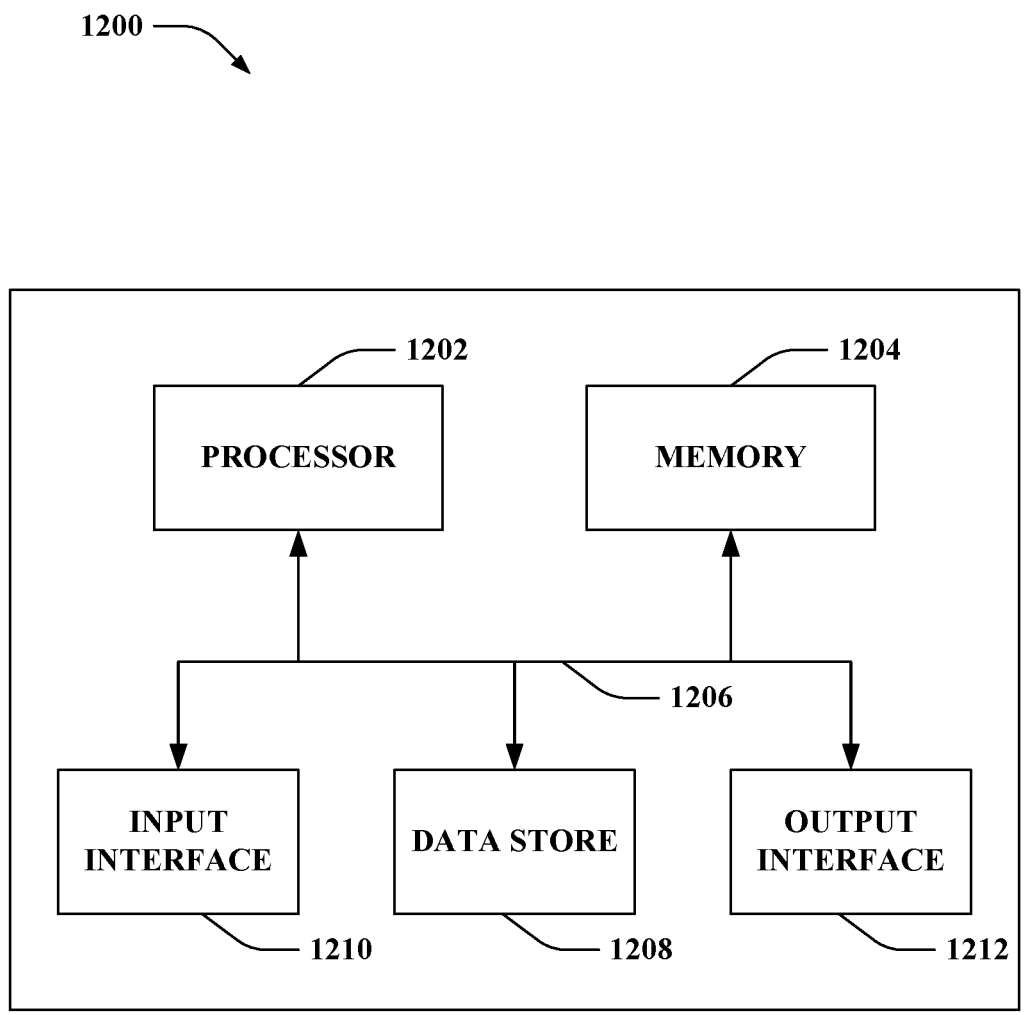
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may be the server computing device 102, the provider mobile device 106, the receiver mobile device 108, the network computing device 124, the appointed mobile device 204, the mobile device 502, one of the mobile devices 602-606, or a combination thereof. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store shared credentials, usage data, access rights data, and so forth.

The computing device 1200 additionally includes a data store 1208 that is accessible by the processor 1202 by way of the system bus 1206. The data store 1208 may include executable instructions, shared credentials, usage data, access rights data, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A server computing device, comprising:
   at least one processor; and
   memory that comprises computer-executable instructions that, when executed by the at least one processor, cause the at least one processor to perform acts including:
   forming a group of users between whom credentials for a Wi-Fi network are shared, the group of the users being formed based on shared calendar information of the users;
   determining that two or more mobile devices of the users included in the group of the users are within a geographic proximity, the two or more mobile devices including a provider device authorized to share the credentials for the Wi-Fi network and one or more additional mobile devices;
   determining access rights data for the credentials, the access rights data indicating a subset of network resources from a collection of network resources accessible via the Wi-Fi network; and
   based on determining that the two or more mobile devices of the users included within the group of the users are within the geographic proximity, sharing the credentials for the Wi-Fi network, the credentials for the Wi-Fi network being shared by the provider device, the credentials for the Wi-Fi network being shared with the one or more additional mobile devices, wherein the credentials for the Wi-Fi network are usable by the one or more additional mobile devices to connect to the Wi-Fi network and access the subset of network resources.

2. The server computing device of claim 1, the group of the users further being formed based on social network information of the users.

3. The server computing device of claim 1, the group of the users further being formed based on participation of the users in a common event.

4. The server computing device of claim 1, the group of the users further being formed based on geographic location information of the users.

5. The server computing device of claim 1, the memory further comprises computer-executable instructions that, when executed by the at least one processor, cause the at least one processor to perform acts including:
   transmitting, from the server computing device, the credentials for the Wi-Fi network to the one or more additional mobile devices.

6. The server computing device of claim 1, the memory further comprises computer-executable instructions that, when executed by the at least one processor, cause the at least one processor to perform acts including:
   receiving access rights data for the Wi-Fi network from the provider device; and
   wherein sharing the credentials includes transmitting the access rights data to a network computing device in the Wi-Fi network, the access rights data causes the network computing device to control accessibility to the subset of network resources provided by the Wi-Fi network using the credentials for the Wi-Fi network.

7. The server computing device of claim 6, wherein the access rights data specifies that the credentials for the Wi-Fi network are:
   permitted to be utilized by the one or more additional mobile devices to access the subset of the network resources of the Wi-Fi network; and
   inhibited from be utilized by the one or more additional mobile devices to access an additional subset of the network resources of the Wi-Fi network.

8. The server computing device of claim 1, the credentials for the Wi-Fi network are shared by the provider device in response to a user of the provider device joining the group of the users.

9. The server computing device of claim 1, the credentials for the Wi-Fi network are shared by the provider device in response to the provider device joining the Wi-Fi network.

10. A mobile device, comprising:
    at least one processor; and
    memory that comprises computer-executable instructions that, when executed by the at least one processor, cause the at least one processor to perform acts including:

forming a group of users between whom credentials for a Wi-Fi network are shared, the group of the users being formed based on shared calendar information of the users;
determining that the mobile device is within a geographic proximity of one or more additional mobile devices of one or more users included within the group of the users, wherein the mobile device is authorized to share the credentials for the Wi-Fi network;
determining access rights data for the credentials, the access rights data indicating a subset of network resources from a collection of network resources accessible via the Wi-Fi network;
transmitting the credentials for the Wi-Fi network to a server computing device external to the Wi-Fi network; and
based on determining that the mobile device is within the geographic proximity of the one or more additional mobile devices of the one or more users included within the group of the users, authorizing the server computing device to provide the credentials for the Wi-Fi network to the one or more additional mobile devices of the one or more users in the group of the users, wherein the credentials for the Wi-Fi network are usable by the one or more additional mobile devices to connect to the Wi-Fi network and access the subset of network resources.

11. The mobile device of claim 10, the group of the users further being formed based on social network information of the users.

12. The mobile device of claim 10, the group of the users further being formed based on participation of the users in a common event.

13. The mobile device of claim 10, the group of the users further being formed based on geographic location information of the users.

14. The mobile device of claim 10, the memory further comprises computer-executable instructions that, when executed by the at least one processor, cause the at least one processor to perform acts including:
receiving differing credentials for a differing Wi-Fi network from the server computing device, wherein the differing credentials for the differing Wi-Fi network are shared with the group of the users by at least one of the one or more additional mobile devices; and
connecting the mobile device to the differing Wi-Fi network utilizing the differing credentials for the differing Wi-Fi network.

15. The mobile device of claim 10,
wherein sharing the credentials includes transmitting access rights data for the Wi-Fi network from the mobile device, the access rights data causes a network computing device in the Wi-Fi network to control accessibility to the subset of network resources provided by the Wi-Fi network using the credentials for the Wi-Fi network.

16. A method, comprising:
forming a group of users between whom credentials for a Wi-Fi network are shared, the group of the users being formed based shared calendar information of the users;
determining that two or more mobile devices of the users included in the group of the users are within a geographic proximity, the two or more mobile devices including a provider device authorized to share the credentials for the Wi-Fi network and one or more additional mobile devices;
determining access rights data for the credentials, the access rights data indicating a subset of network resources from a collection of network resources accessible via the Wi-Fi network; and
based on determining that the two or more mobile devices of the users included within the group of the users are within the geographic proximity, sharing the credentials for the Wi-Fi network, the credentials for the Wi-Fi network being shared by the provider device, the credentials for the Wi-Fi network being shared with the one or more additional mobile devices, wherein the credentials for the Wi-Fi network are usable by the one or more additional mobile devices to connect to the Wi-Fi network and access the subset of network resources.

17. The method of claim 16, the group of the users further being formed based on social network information of the users.

18. The method of claim 16, the group of the users further being formed based on participation of the users in a common event.

19. The method of claim 16, the group of the users further being formed based on geographic location information of the users.

20. The method of claim 16, further comprising:
receiving access rights data for the Wi-Fi network from the provider device; and
wherein sharing the credentials includes transmitting the access rights data to a network computing device in the Wi-Fi network, the access rights data causes the network computing device to control accessibility to the subset of network resources provided by the Wi-Fi network using the credentials for the Wi-Fi network.

* * * * *